Jan. 27, 1948.  D. D. GRIEG  2,434,921
PULSE AMPLITUDE SELECTIVE SYSTEM
Filed Nov. 2, 1944  4 Sheets-Sheet 1
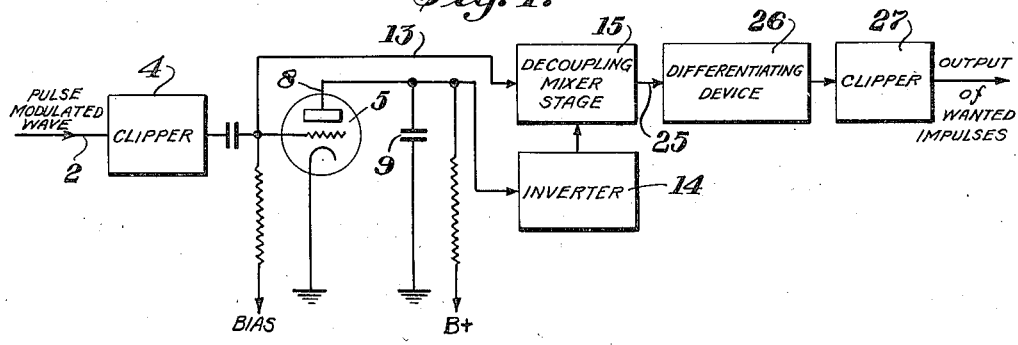
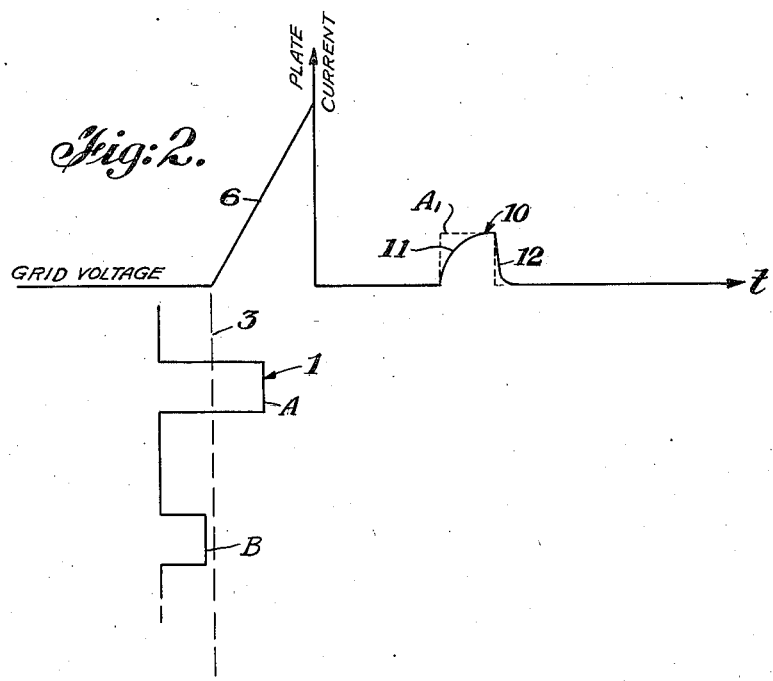
INVENTOR.
DONALD D. GRIEG
BY Percy P. Lantry
ATTORNEY

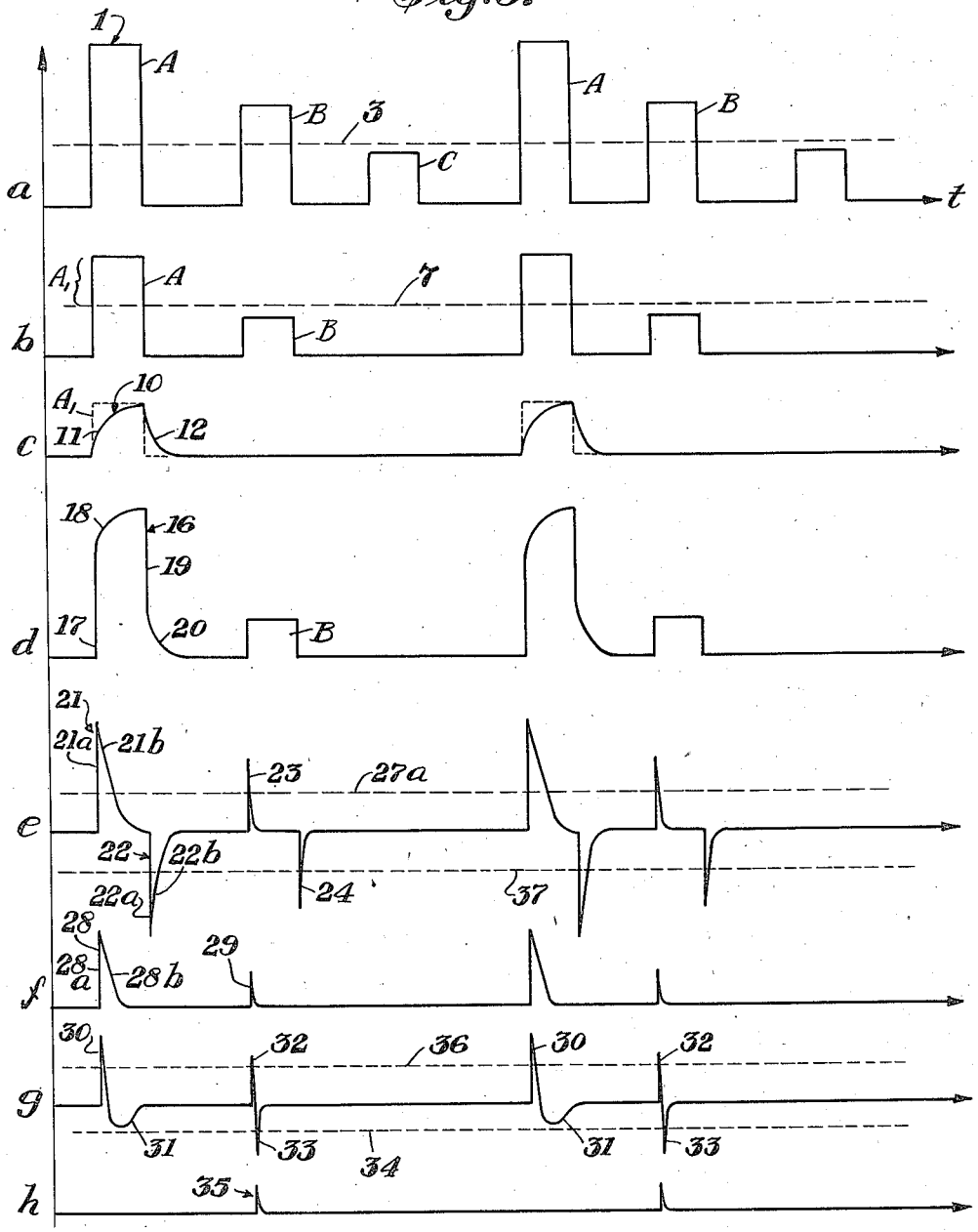

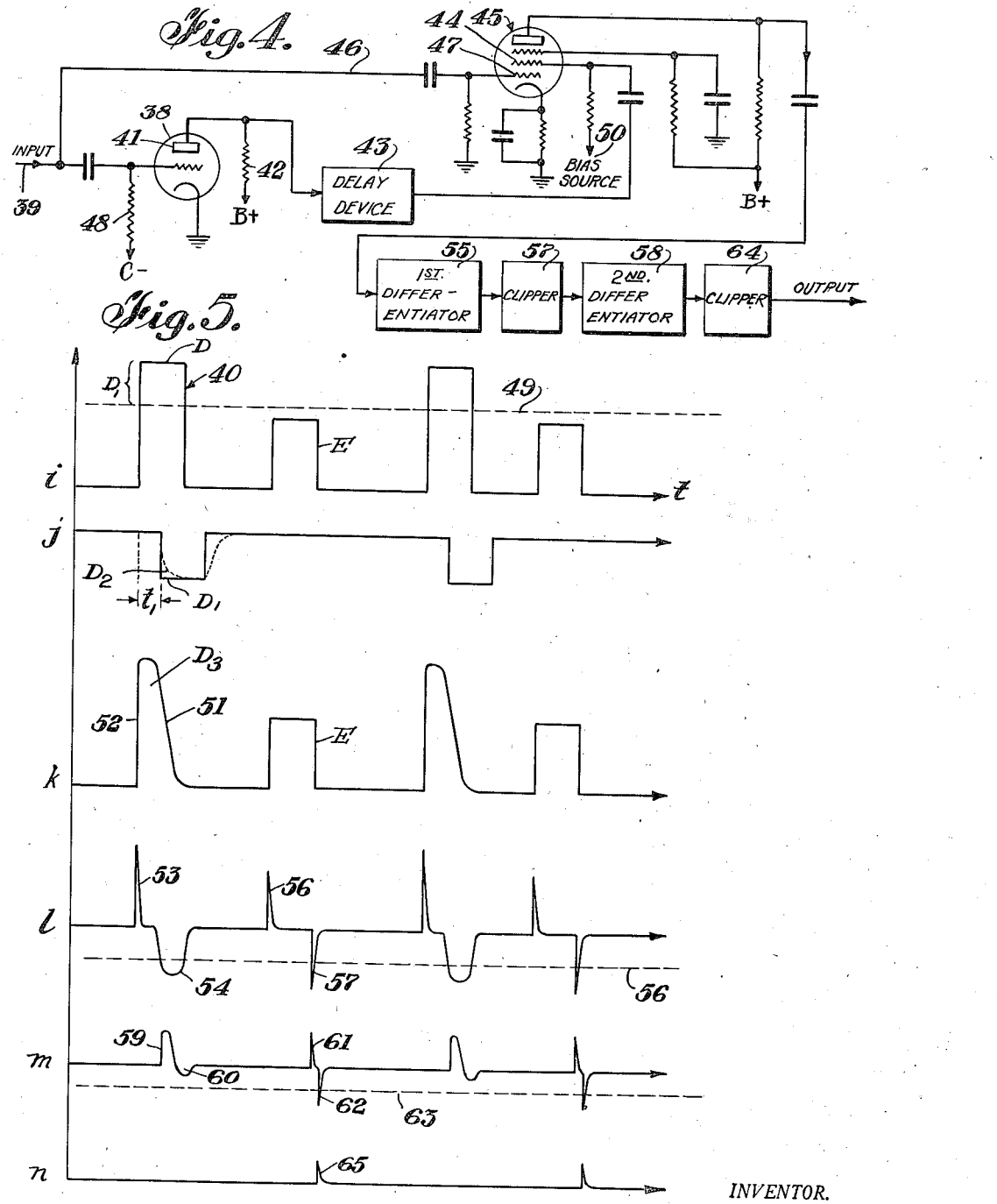

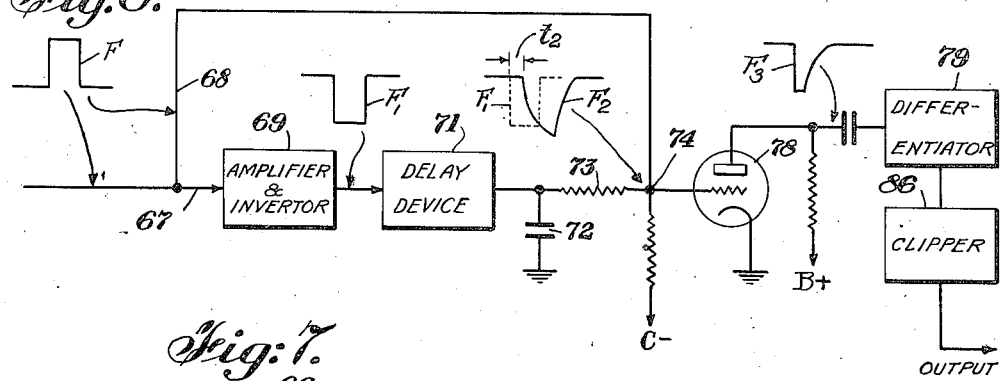
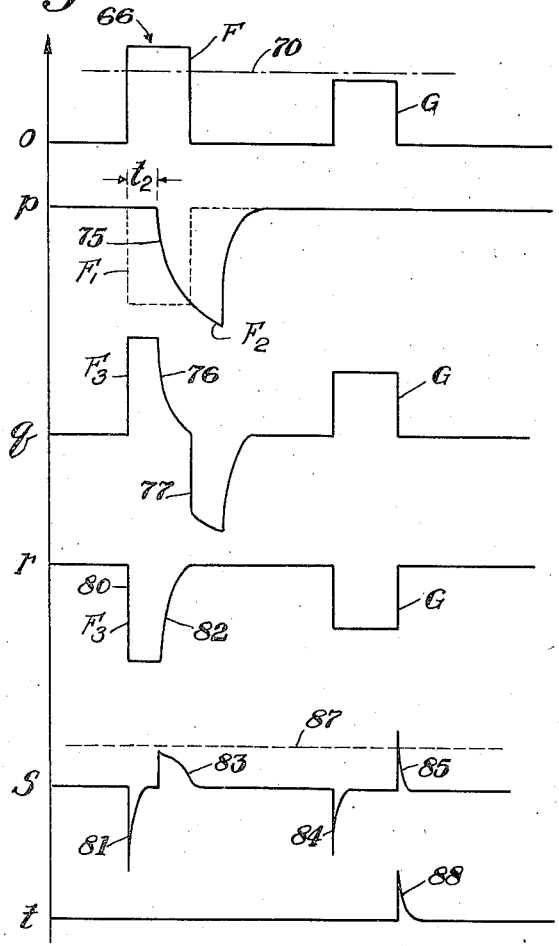

Patented Jan. 27, 1948

2,434,921

UNITED STATES PATENT OFFICE 2,434,921

PULSE AMPLITUDE SELECTIVE SYSTEM

Donald D. Grieg, Forest Hills, N. Y., assignor to Federal Telephone and Radio Corporation, New York, N. Y., a corporation of Delaware Application November 2, 1944, Serial No. 561,553

21 Claims. (Cl. 250—27)

This invention relates to radio pulse systems and more particularly to systems for discriminating between electrical pulses in accordance with the amplitude of the pulses. This application is a continuation in part of my copending application Serial No. 467,516, now abandoned, filed December 1, 1942, and is related to my copending application, Serial No. 561,554, filed Nov. 2, 1944, directed to similar subject matter.

Excluding the condition of superposition of pulses, there exist three possibilities of relative amplitude variation during interference between series of wanted and unwanted electrical pulses. These possibilities are where the amplitude of the unwanted pulse is smaller, equal to, or larger than the amplitude of a wanted pulse. Where the unwanted pulse is smaller, it may be eliminated by simple clipping. The probability of two different sources of pulses having the same amplitude and thus causing interference at a receiver is so small as to be negligible. However, the elimination of unwanted pulses of greater amplitude than wanted pulses has heretofore presented a more difficult problem.

It is an object of this invention to discriminate selectively between pulses differing in amplitude so as to eliminate unwanted pulses regardless of the magnitude of their amplitude relative to wanted pulses.

The method of my invention may, for example, comprise distorting the leading or trailing, or both edges of the unwanted pulses of amplitude greater than the amplitude of the wanted pulses to decrease the slope, then differentiating or otherwise processing the distorted pulses along with the wanted pulses to provide derivation pulses of one polarity corresponding to the leading edges of the input pulses, and derivation pulses of opposite polarity corresponding to the trailing edges of the input pulses. The derivation pulses corresponding to the distorted edges will have, after one or more differentiating operations, smaller amplitudes than the other derivation pulses. The derivation pulses resulting from the differentiating step are clipped at a level at least as high as the amplitude of the pulses derived from the distorted edges, thereby obtaining a pulse output in accordance with the occurrence of the wanted input pulses.

The distortion of leading and/or trailing edges of the larger amplitude pulses may be accomplished by producing dissimilar pulse potentials in response to the larger amplitude pulses which are combined or applied in one way or another to the larger amplitude pulse energy, thereby distorting either its leading or trailing edge, or both, so that when the pulses are differentiated, the distorted edge or edges will not produce pulses increasing and decreasing sharply in amplitude. Instead, the distorted edges of the input pulse produce upon differentiation blunt or curved pulses which, in many cases, may be of smaller amplitude than the pulses produced by differentiation of the wanted pulses. Should the blunt pulses thus produced by the distorted edges be of greater amplitude than the pulses produced from the edges of the wanted pulse, the differentiating operation may be repeated and, since the blunt pulses corresponding to the edges of the distorted pulse become less and less sharp, they can be eliminated or at least reduced to such an amplitude that a clipping operation will completely eliminate the effect of the larger input pulses.

The dissimilar pulse potentials used for distorting the unwanted pulses may be produced by different methods. For example, each larger input pulse may be clipped and the clipped portion distorted by condenser action, or it may be displaced in time relative to the input pulse, or both. The dissimilar pulse potential and the input pulse may be combined either by an algebraic mixing action (addition or subtraction), or by altering, by means of the dissimilar pulse potential, the gain of an amplifier to which the input pulses are applied.

For a better understanding of the methods of my invention and of systems by which the methods may be practiced, reference may be made to the following detailed description to be read in connection with the accompanying drawings, in which:

Fig. 1 is a schematic illustration of a circuit by which the selective discrimination between the pulses in accordance with amplitude may be effected;

Figs. 2 and 3 are graphical illustrations showing the steps of operation by which pulses of intermediate amplitude can be selectively removed from a train having pulses with amplitudes less than, equal to, and greater than the wanted intermediate pulses;

Fig. 4 is a schematic illustration of another system by which the method of this invention may be practiced;

Fig. 5 is a graphical illustration useful in explaining the operation of the system of Fig. 4.

Fig. 6 is a schematic illustration of a further system of the invention; and

Fig. 7 is a graphical illustration useful in explaining the operation of the system of Fig. 6.

Referring to Figs. 1, 2 and 3 of the drawings, a pulse modulated wave or pulse train 1 is applied to the input 2 of the system of Fig. 1. The train 1 is shown in Fig. 3, curve a, to contain pulses A, B and C wherein the pulses B are the wanted pulses which may be modulated in either time or width with intelligence. The pulses A and C which are larger and smaller in amplitude, respectively, than pulses B may comprise two additional channels of intelligence or merely represent dummy or interfering pulses.

Since the most difficult discrimination exists where the wanted and unwanted pulses have leading and trailing edges of substantially identical slope, I have chosen to illustrate my invention with pulses of that characteristic. It will be understood, of course, that the shape characteristics may differ widely between the wanted and unwanted pulses without altering the discriminating ability of my invention.

The pulses C of less amplitude are eliminated by first clipping the train of pulses along the amplitude level 3 by passing the wave through a clipper 4. The output of the clipper 4, curve b, is applied to a tube circuit having a vacuum tube 5 which is biased in accordance with the dynamic curve 6 shown in Fig. 2, whereby only the upper portion $A_1$ of the larger amplitude pulses, which extends beyond level 7, appears in the anode circuit 8 of the tube. Connected between the anode circuit 8 and ground is a condenser 9 adapted to be charged upon the occurrence of plate current whereby the pulse portion $A_1$ will be distorted. This distortion provides an output pulse 10 having curved leading and trailing edges 11 and 12 substantially as shown in Fig. 2, and curve c, Fig. 3. Energy of the pulses A and B is shunted by a connection 13 about the tube 5 and inverter 14 to the mixer stage 15 which may be a conventional double triode stage with plates in parallel. The pulse 10 combines in the plate circuit of the mixer stage with the larger amplitude pulse from which it is produced. This combining of the pulse 10 to the pulse A results, where both are of the same polarity, in a pulse 16 the leading and trailing edges of which are distorted as indicated by curve d. The lower leading edge portion 17 of the pulse 16 is substantially vertical but the upper leading edge portion 18 curves from the vertical to the trailing edge portion 19, in accordance with the curved leading edge of pulse 10, thereby eliminating the sharp upper left hand corner substantially as indicated by the overlapping pulse shapes of curve c. The upper trailing edge portion 19, curve d, is substantially vertical while the lower trailing edge portion 20 is curved according to the trailing edge of pulse 10. Thus, the upper left hand corner and the lower right hand corner of the pulse A (now pulse 16) are curved so that subsequent differentiation of the pulse produces pulses 21 and 22, curve e, the trailing edges of which have slopes corresponding to the curvatures of the portions 18 and 20, respectively.

The pulse output at 25 (Fig. 1) is applied to a known differentiating device 26 whereby alternate positive and negative pulse derivations 21, 22 and 23, 24, curve e, are produced corresponding in time with the leading and trailing edges of the pulse 16 and the pulse B, respectively. The vertical portion 17 results in a vertical rise 21a and curved portion 18 results in an exponential drop substantially as indicated at 21b. The leading and trailing edges 22a and 22b resulting from the trailing edge portions 19 and 20 are similarly shaped in a negative direction. Differentiation of the pulse B results in sharper positive and negative pulses 23 and 24 than the pulses 21 and 22, the pulses 23 and 24 corresponding, respectively, to the leading and trailing edges of the pulse B.

Should it be desired to obtain a pulse output in accordance with the leading edges of the pulse B, the positive pulses 21 and 23 may be threshold clipped at 27 as indicated by the line 27a and the peak portions 28 and 29 resulting therefrom, curve f, differentiated. The derivations of such a differentiation of pulse 28 are a sharp positive pulse 30, curve g, corresponding to the vertical edge 28a, and a blunt negative pulse 31 corresponding to the sloping edge 28b. Differentiation of pulse 29 results in positive and negative pulses 32 and 33 both of which correspond substantially in time to the leading edge of pulse B. The pulse 31, curve g, resulting from the sloping edge 28b, curve f, is of smaller amplitude than pulse 33. By clipping the negative pulses 33 at a level 34 beyond the pulse 31, a unidirectional pulse 35, curve h, is obtained corresponding substantially to the occurrence of the leading edge of the pulse B.

Should one clipping and differentiation be insufficient to reduce the pulse energy resulting from portion 18 or 20, curve d, to less amplitude than the pulse energy resulting from the leading or trailing edge of pulse B, additional clipping and differentiating operations may be made. This would be necessary if the clipping level were chosen at 36 instead of at 34, curve g.

If a unidirectional pulse is desired corresponding to the trailing edge of the pulse B, the negative pulses 22 and 24, curve e, are threshold clipped as indicated by the clipping level 37, curve e. The output of this clipping operation is differentiated in the same manner as described in connection with the pulses of curve f and if necessary the clipping and differentiating operations may be repeated should the slope of the edge 22b be too sharp.

In Figs 4 and 5, another system is shown including a triode 38 having an input 39 to which a pulse train 40, curve i, may be applied. The anode 41 of the tube is connected to a positive potential source through a resistor 42, and is further connected to the delay device 43, which in turn is connected to a control grid 44 of an amplifier tube 45. The input 39 is connected by a connection 46 to the control grid 47 of the amplifier tube 45. The tube 38 is so biased through resistor 48 as to pass a portion $D_1$ of the larger amplitude pulses D occurring above a cut-off level 49, curve i, Fig. 5. A delay $t_1$, curve j, is imposed on the pulse portion $D_1$ by means of the delay device 43 which preferably comprises a resistance-capacitance network. This network together with resistor 42 distorts the clipped energy as indicated at $D_2$. The energy $D_2$ being applied to the grid 44 alters the gain of the amplifier tube 45 which in this circuit is shown to be normally controlled by bias source 50, thereby distorting the input pulse D as indicated at $D_3$, curve k. The distortion, however, is in the trailing edge 51 of the pulse.

When the pulses $D_3$ and E are differentiated at 55, the slope of the leading edge 52 of the pulse $D_3$ produces, as shown in curve L, a sharp pulse 53 while the slope of the trailing edge 51 produces a blunt pulse 54. The pulse E produces, upon differentiation sharp pulses 56 and 57, curve L.

Should the pulse 57 fail to extend beyond the amplitude of the blunt pulse 54, the output of the differentiating device 55 is clipped at level 56 by passing the pulse energy through a clipper 57, and then re-differentiated in a second differentiating device 58 thereby producing pulses 59 and 60, curve $m$, corresponding to the leading and trailing edges of the pulse 54, and sharp pulses 61 and 62 corresponding to the two edges of pulse 57. By clipping this pulse energy at a level 63 in a clipper 64, a pulse output 65, curve $n$, corresponding to the trailing edges of the pulse E is produced.

In Figs. 6 and 7 I show a further embodiment of the invention in which the delayed pulse portion is mixed with the unwanted pulse for distorsion of the trailing edge thereof. The unwanted pulse F of the pulse train 66, curve $o$, is applied to input connections 67 and 68, the energy over connection 67 being fed to an amplifier 69 biased to threshold clip the pulses at a level 70 at least as high as the amplitude of the wanted pulse G, whereby the upper portion of the unwanted pulse F is obtained, amplified and inverted as indicated at $F_1$, curve $p$. The inverted pulse portion $F_1$ is applied to a delay device 71 whereby the pulse portion is retarded an amount $t_2$. It is then applied to a capacitance-resistance circuit 72, 73 where it is distorted as indicated at $F_2$. The resistance 73 is chosen high so that it operates to isolate connection 68 from the capacitance 72. The distorted pulse potential $F_2$ is mixed with energy of the unwanted pulse F and the wanted pulses G at connection 74. The pulse potential $F_2$ being retarded by an amount $t_2$ relative to the unwanted pulse F adds algebraically thereto as indicated by the wave $q$, Fig. 7. The leading edge 75 of the pulse potential $F_2$ subtracts from the trailing portion of the pulse F thereby distorting the trailing edge thereof as indicated at 76. The portion of the pulse potential $F_2$ extending beyond the trailing edge of the pulse F appears in the wave at 77 as a negative pulse.

The wave train such as illustrated in curve $q$ is applied to a control grid to a vacuum tube 78 which operates to remove the negative pulse portion 77 as indicated by wave $r$. It will be noted also that the tube 78 inverts the pulse energy so that when the pulses of wave $r$ are applied to differentiator 79, the leading edge 80 of the distorted pulse $F_3$ produces a sharp negative pulse 81 while the distorted trailing edge 82 produces a blunt positive pulse 83. The differentiator also produces sharp negative and positive derivation pulses 84 and 85 corresponding in time with the leading and trailing edges of the wanted pulse G. It will be noted that the distortion of the unwanted pulse may be sufficient to result in a derivation pulse of smaller amplitude than the derivation pulse resulting from the trailing edge of the wanted pulse G. This condition as illustrated in curve $s$ clearly indicates that by applying the output of the differentiator 75 to a clipper circuit 86 capable of clipping the pulses at a level 87, at least as high as the amplitude of the pulse 83, a pulse output 88 corresponding to the occurrence of the trailing edges of the wanted pulses is obtained.

While I have described the principles of my invention in connection with several specific systems, it will be clearly understood that this description is made only by way of example. Many other methods and systems of distorting the larger amplitude pulses may be used. Furthermore, the amplitude of the larger pulses may be reduced during the threshold clipping by using a known "gate" clipper. It will be understood, therefore, that the description of the systems are illustrative of the invention rather than restrictive of the scope as set forth in the appended claims.

I claim:

1. A method of discriminating between wanted and unwanted electrical pulses each of said pulses having leading and trailing edges of similar slope characteristics where the unwanted pulse is of amplitude greater than the wanted pulse, comprising distorting at least one edge of said unwanted pulse, processing said distorted unwanted pulse and said wanted pulse to derive pulses from said distorted edge and the corresponding edge of said wanted pulse, the distortion of said one edge rendering the derived pulse thereof of smaller amplitude than the pulse derived from the corresponding edge of said wanted pulse, and clipping the derivation pulses at an amplitude level at least as high as said smaller amplitude to obtain an output pulse corresponding to said wanted pulse.

2. A method according to claim 1 wherein said processing operation includes one or more differentiating operations.

3. A method according to claim 1 wherein the operation of distorting said unwanted pulse includes decreasing at least in part the steepness of the slope of one of the edges thereof.

4. A method according to claim 1 wherein the operation of distorting said unwanted pulse includes clipping energy of said unwanted pulse at an amplitude level at least as high as the amplitude of said wanted pulse, changing the shape of the clipped portion, and combining the clipped portion to the unwanted pulse.

5. A method according to claim 1 wherein the operation of distorting said unwanted pulse includes clipping the said unwanted pulse at an amplitude level at least as high as the amplitude of said wanted pulse, re-shaping the clipped portion to reduce the steepness of at least one of the edges thereof, and combining the re-shaped clipped portion to said unwanted pulse.

6. A method according to claim 1 wherein the operation of distorting said unwanted pulse includes clipping said unwanted pulse at an amplitude level at least as high as the amplitude of said wanted pulse, retarding the clipped portion, and combining the clipped portion to energy of said unwanted pulse.

7. A method according to claim 1 wherein the operation of distorting said unwanted pulse includes clipping said unwanted pulse at an amplitude level at least as high as the amplitude of said wanted pulse, retarding and reshaping the clipped portion to distort one of the edges thereof and to cause the distorted edge to overlap in time the trailing portion of the unwanted pulse, and combining the clipped portion to energy of said unwanted pulse.

8. A method of discriminating between wanted and unwanted electrical pulses of similar shape characteristics where the unwanted pulses are of amplitude greater than the wanted pulses, comprising producing, in response to said unwanted pulses, pulse potentials dissimilar to said unwanted pulses, applying the dissimilar pulse potentials to energy of said unwanted and wanted pulses thereby producing distorted pulses of the unwanted pulses, differentiating said distorted pulses and said wanted pulses to derive therefrom pulses of one polarity corresponding to the leading edges thereof and pulses of opposite polarity corresponding to the trailing edges thereof, the distortion of said distorted pulses rendering the pulses derived therefrom, in at least one polarity direction, of smaller amplitude than those derived from the wanted pulses, and clipping the derivation pulses at a level at least as high in said one polarity direction as said smaller amplitude to obtain a pulse output corresponding to the occurrence of said wanted pulses.

9. A method according to claim 8 wherein the pulse potential producing operation includes producing a pulse potential different from the shape of said unwanted pulses.

10. A method according to claim 8 wherein the pulse potential producing operation includes producing the pulse potentials at a given time displacement with respect to the occurrence of said unwanted pulses.

11. A method according to claim 8 wherein the pulse potential producing operation includes producing in synchronism with said unwanted pulses, pulse potentials having a shape dissimilar to the shape of said unwanted pulses.

12. A method of selectively discriminating between electrical pulses of similar shape characteristics and of different amplitudes to eliminate those pulses of amplitude different from a given amplitude, comprising threshold clipping the pulses at a level at least as high as the greatest amplitude of those pulses smaller than said given amplitude, distorting at least one edge of the pulses of amplitude greater than said given amplitude, differentiating the distorted pulses and the pulses of said given amplitude to provide pulses from said distorted edges and the corresponding edges of the pulses of said given amplitude, the distortion of said distorted edges rendering the pulses derived therefrom of smaller amplitude than pulses derived from the corresponding edges of the pulses of said given amplitude, and clipping the derivation pulses at a level at least as high as said smaller amplitude, thereby obtaining a pulse output in accordance with the occurrence of the pulses of said given amplitude.

13. A system for discriminating between wanted and unwanted electrical pulses of similar shape characteristics where the unwanted pulse is greater in amplitude, comprising means to distort at least one edge of said unwanted pulse, means to process said wanted and said distorted unwanted pulses to derive pulses from said distorted edge and the corresponding edge of said wanted pulse, the distortion of said one edge rendering the pulse derived therefrom of smaller amplitude than the pulse derived from the corresponding edge of the wanted pulse, and means to clip the derivation pulses at a level at least as high as said smaller amplitude thereby obtaining an output pulse corresponding to said wanted pulse.

14. A system according to claim 13 wherein the means to distort the unwanted pulse comprises means for decreasing at least in part the slope of said one edge.

15. A system according to claim 13 wherein the processing means includes one or more differentiating means.

16. A system for discriminating between wanted and unwanted electrical pulses of similar shape characteristics where the unwanted pulse is greater in amplitude, comprising means to clip the unwanted pulse at a level at least as high as the amplitude of said wanted pulses, means to change the shape of the clipped portion, means for processing the clipped portion to energy of said unwanted pulse to distort the shape thereof in accordance with the changed shape of said clipped portion, means to process the distorted unwanted pulse and said wanted pulse to produce derivation pulses, the distortion of the unwanted pulses rendering the pulse derived therefrom smaller than the pulse derived from said wanted pulse, and means to clip the derivation pulses at a level at least as high as said smaller derivation pulse to obtain an output pulse corresponding to said wanted pulse.

17. A system according to claim 16 wherein the means for clipping said unwanted pulse includes a vacuum tube, and means to bias the vacuum tube to cut-off at a desired level.

18. A system according to claim 16 wherein the means for changing the shape of the clipped portion includes a circuit having a condenser adapted to be charged and discharged by the clipped portion thereby altering the shape of the leading and trailing edges thereof.

19. A system according to claim 16 wherein the means for changing the shape of the clipped portion comprises a circuit having a delay characteristic adapted to retard the clipped portion a predetermining amount so that said clipped portion overlaps in time the trailing portion of said unwanted pulse.

20. A system according to claim 16 wherein the means for processing said clipped portion to energy of said unwanted pulse includes a mixer tube, and means for varying the gain of said tube in accordance with the potential of said clipped portion.

21. A system according to claim 16 wherein the means for processing said clipped portion to energy of said unwanted pulse includes means for algebraically adding said clipped portion to the energy of said unwanted pulse.

DONALD D. GRIEG.

REFERENCES CITED

The following references are of record in the file of this patent:

UNITED STATES PATENTS

| Number | Name | Date |
| --- | --- | --- |
| 2,153,202 | Nichols | Apr. 4, 1939 |
| 2,157,677 | Runge | May 9, 1939 |
| 2,180,355 | Haffcke | Nov. 21, 1939 |
| 2,212,173 | Wheeler et al. | Aug. 20, 1940 |
| 2,310,692 | Hansell | Feb. 9, 1943 |
| 2,326,584 | Van Zelst | Aug. 10, 1943 |
| 2,241,170 | Ulbricht | May 6, 1941 |
| 2,286,450 | White et al. | June 16, 1942 |
| 2,294,341 | Moore | Aug. 25, 1942 |
| 2,344,697 | Hollingsworth | Mar. 21, 1944 |

FOREIGN PATENTS

| Number | Country | Date |
| --- | --- | --- |
| 290,979 | Great Britain | May 18, 1928 |